United States Patent Office 2,695,902
Patented Nov. 30, 1954

2,695,902

2-METHYL-3-(β-CHLOROETHYL)-4,6-DICHLORO PYRIDINE AND METHOD OF MAKING SAME

Andrew N. Wilson, Colonia, and Stanton A. Harris, Westfield, N. J., assignors to Merck & Co., Inc., Rahway, N. J., a corporation of New Jersey No Drawing. Application September 27, 1950, Serial No. 187,158

9 Claims. (Cl. 260—290)

This invention relates to the new chemical compound, 2-methyl-3-(β-chloroethyl)-4,6-dichloropyridine, a method for its preparation, and processes for converting this compound to 2-methyl-3-(β-chloroethyl)-pyridine.

In a process described in J. Org. Chem. 6, 54 (1941), 2-methyl-3-(β-chloroethyl)-pyridine was obtained from 2-methyl-3-(β-ethoxyethyl) - 4,6 - dihydroxypyridine by a three step process comprising, refluxing said starting material with phosphorus oxychloride to form 2-methyl-3-(β-ethoxyethyl)-4,6-dichloropyridine, reducing this compound with hydrogen in the presence of a hydrogenation catalyst to obtain 2-methyl - 3 - (β-ethoxyethyl)-pyridine which on treatment with concentrated hydrochloric acid was converted to the desired compound. The 2-methyl-3-(β-chloroethyl)-pyridine may then be converted by hydrolysis to obtain 2-methyl-3-(β-hydroxymethyl)-pyridine which is a useful intermediate in the synthesis of neopyrithiamine, the pyridine analog of thiamine. This pyridine analog of thiamine possesses marked and effective antivitamin activity.

This invention is concerned with an improved process for preparing 2-methyl-3-(β-chloroethyl)-pyridine. It is one object of this invention to provide a new pyridine derivative, 2 - methyl-3-(β-chloroethyl)-4,6-dichloropyridine, which is a useful intermediate in preparing 2-methyl-3-(β-chloroethyl)-pyridine. It is a further object to provide a method for obtaining this new compound. Another object is to provide a process for converting our new compound to 2-methyl-3-(β-chloroethyl)-pyridine. Other objects will be apparent from the detailed description hereinafter provided.

In accordance with our present invention, we have found that 2-methyl-3-(β-chloroethyl)-pyridine is more readily and conveniently obtained by a two step process which may be illustrated as follows:

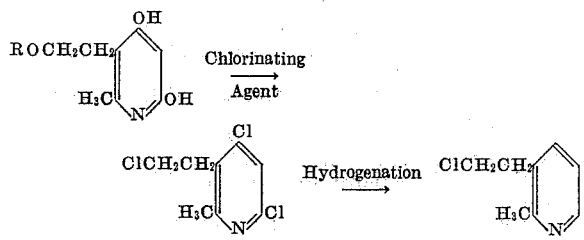

wherein R represents an alkyl group.

In the first step of our process, the 2-methyl-3-(β-alkoxyethyl)-4,6-dihydroxypyridine is reacted with a chlorinating agent such as phosphorus oxychloride, phosphorus pentachloride, and the like at elevated temperature under superatmospheric pressure to produce 2-methyl-3-(β-chloroethyl)-4,6-dichloropyridine. This step is conveniently accomplished by heating the chlorinating agent and the 2-methyl-3-(β-alkoxyethyl) - 4,6 - dihydroxypyridine in a pressure vessel for sufficient time to effect the desired reaction. In carrying out this reaction with 2-methyl-3-(β-ethoxyethyl)-4,6-dihydroxypyridine utilizing phosphorus oxychloride as the chlorinating agent, we have obtained excellent yields of the desired product by reacting these substances together at about 140° C. for 6 hours. Similarly, other β-alkoxy derivatives may be used in place of the β-ethoxy derivative.

After cooling the resulting reaction mixture, the 2-methyl-3-(β-chloroethyl)-4,6-dichloropyridine is readily recovered by evaporating any excess chlorinating agent and volatile byproducts under diminished pressure, dissolving the residue in water, and cooling the resulting aqueous solution to cause precipitation of the product in crystalline form. The product may then be removed and dried. Any residual traces of the product in the mother liquor may be recovered by extraction with a water-immiscible solvent such as chloroform, and obtained in solid form by concentrating the chloroform extracts to dryness. If desired, the final product may be further purified by recrystallization from suitable organic solvents such as methyl alcohol, ethyl alcohol, isopropyl alcohol, and the like.

The 2-methyl-3-(β-chloroethyl)-4,6-dichloropyridine is obtained in the form of a white solid having a melting point of about 55–56° C.

In accordance with a further embodiment of our invention, this product is readily converted by reduction with hydrogen in the presence of a hydrogenation catalyst to 2-methyl-3-(β-chloroethyl)-pyridine. This is conveniently accomplished by intimately contacting a solution of the compound in an inert solvent such as methanol, ethanol, and the like with hydrogen in the presence of a hydrogenation catalyst. We have obtained particularly good yields of product by carrying out this reduction in the presence of a catalyst consisting of palladium suspended on barium sulfate. Similarly, other salts or oxides of palladium or solid palladium itself are equally suitable as catalysts for this reaction.

The 2-methyl-3-(β-chloroethyl)-pyridine is recovered from the hydrogenation mixture by removing the suspended catalyst and concentrating the solution to dryness under reduced pressure. The identity of this substance was established by preparing the corresponding picric acid salt.

It is indeed surprising that this reduction can be effected without reducing the β-chloro substituent since it would have been anticipated that this chlorine would be most readily reduced forming an ethyl group under these reaction conditions.

As was indicated previously, the 2-methyl-3-(β-chloroethyl)-pyridine may be readily hydrolyzed to obtain the corresponding 3-(β-hydroxyethyl) compound which is useful as an intermediate for preparing neopyrithiamine and other compounds.

The following examples are presented to illustrate specific embodiments of our invention:

Example 1

Five grams of 2-methyl-3-(β-ethoxyethyl)-4,6-dihydroxypyridine was dissolved in 25 ml. of freshly distilled phosphorus oxychloride. A small amount of heat was evolved but there was no obvious evolution of hydrogen chloride. The solution was sealed in a combustion tube and heated at 140° C. for six hours. The excess phosphorus oxychloride was removed by distillation under reduced pressure, and to the residue was added a large excess of crushed ice so that no heating occurred. The product separated as a crystalline solid. It may be obtained by filtration and purified by recrystallization from alcohol; or it may be obtained by steam distillation from the mixture, which has been made alkaline with potassium hydroxide. The yield of 2-methyl-3-(β-chloroethyl)-4,6-dichloropyridine was 4.8 g. (84% of the theory); M. P. 55–56° C.

Anal.: Calcd. for $C_8H_8NCl_3$: C, 42.79; H, 3.59; N, 6.24. Found: C, 42.61; H, 3.63; N, 6.33.

Example 2

Forty-two grams of 2-methyl-3-(β-ethoxyethyl)-4,6-dihydroxypyridine was dissolved in 200 ml. of freshly distilled phosphorus oxychloride. A small amount of heat was liberated, but there was no apparent evolution of hydrogen chloride. The solution was heated in sealed combustion tubes at 140° C. for six hours. When the solution had cooled, the excess phosphorus oxychloride was removed under reduced pressure. The oily residue was chilled and a large amount of crushed ice was added rapidly so that no heating occurred. A crystalline material separated on short standing, which was filtered and washed, but not dried. The melting point of a dried sample was 55–56° C.

The mother liquor and washes were combined, diluted to about 1500 ml., and partly neutralized with 30% sodium hydroxide solution until no further precipitation took place. This mixture was extracted twice with chloroform, which extract was washed with water, dried, and concentrated. The melting point of the residue was 51–53° C.

Both solid fractions were combined and dissolved in an excess of petroleum ether. A small amount of brown insoluble amorphous material and some water were removed. The solution was washed with sodium bicarbonate, with water, was dried, and was concentrated to dryness under reduced pressure. The yield of 2-methyl-3-(β-chloroethyl)-4,6-dichloropyridine was 41 g. (86%); M. P. 55–56° C.

Recrystallization of a sample for analysis from isopropyl alcohol showed no change in melting point.

*Example 3*

Forty-one grams of 2-methyl-3-(β-chloroethyl)-4,6-dichloropyridine was dissolved in 2000 ml. of methanol and reduced by hydrogen using 30 g. of palladium on barium sulfate as a catalyst. The reduction was stopped immediately after two moles of hydrogen had been absorbed; the time required was about thirty minutes.

After removal of the catalyst, the solution was concentrated to dryness under reduced pressure leaving a solid residue. The residue, 2-methyl-3-(β-chloroethyl)-pyridine was identified by comparison with that described in the literature; the picrate was prepared, M. P. 135–136° C. (lit. 134–135° C.).

The material was not purified but was hydrolyzed directly, as described in Example 4.

*Example 4*

The crude 2-methyl-3-(β-chloroethyl)-pyridine, prepared as described in Example 3, was dissolved in 500 ml. water and heated in a glass-lined autoclave at 160° C. for four hours. The solution was concentrated to 75–100 ml. in volume and made strongly alkaline with solid potassium hydroxide. This alkaline mixture was extracted with chloroform for three hours in a continuous extractor. The chloroform extract was dried and concentrated to a very small volume. An excess of petroleum ether was added to the residue, and on scratching, the product crystallized. It was filtered, washed and dried. The yield of 2-methyl-3-(β-hydroxyethyl)-pyridine was 23 g. (90% over two steps); M. P. 62–64° C.

Anal.: Calcd. for $C_8H_{11}NO$: C, 70.04; H, 8.08; N, 10.21. Found: C, 69.95; H, 8.30; N, 10.01.

The substance was further identified by preparation of several derivatives:

Picrate_____M. P. 119–120° C. (lit. 123–124°)
P-Nitrobenzoate_____M. P. 112–113° C. (lit. 114–115°)
Methiodide_____M. P. 102–103° C. (lit. 103–104°)

The benzyl bromide derivative was also prepared by reaction of the pyridine compound with an excess of benzyl bromide at room temperature. The crystalline derivative which separated was recrystallized twice from ethanol; M. P. 155–156° C.

Anal.: Calcd. for $C_{15}H_{18}NOBr$: C, 58.44; H, 5.89; N, 4.54. Found: C, 58.64; H, 5.95; N, 4.60.

Various changes and modifications in the foregoing procedure will occur to those versed in the art, and to the extent that such changes and modifications fall within the purview of the appended claims it will be understood that they constitute part of our invention.

We claim:

1. The new compound, 2-methyl-3-(β-chloroethyl)-4,6-dichloropyridine.

2. The process for preparing 2-methyl-3-(β-chloroethyl)-pyridine which comprises reacting 2-methyl-3-(β-alkoxyethyl)-4,6-dihydroxypyridine with a chlorinating agent from the group consisting of phosphorous oxychloride and phosphorous pentachloride at elevated temperature under superatmospheric pressure, recovering 2 - methyl - 3 - (β-chloroethyl)-4,6-dichloropyridine from the resulting reaction mixture, intimately contacting said 2-methyl-3(β-chloroethyl)-4,6-dichloropyridine with hydrogen in the presence of a palladium catalyst, and recovering 2-methyl-3(β-chloroethyl)-pyridine from the resulting hydrogenated product.

3. The process for preparing 2-methyl-3-(β-chloroethyl)-pyridine which comprises reacting 2-methyl-3-(β-alkoxyethyl)-4,6-dihydroxypyridine with phosphorus oxychloride at elevated temperature under superatmospheric pressure, recovering 2-methyl-3-(β-chloroethyl)-4,6-dichloropyridine from the resulting reaction mixture, intimately contacting said 2 - methyl - 3 - (β-chloroethyl)-4,6-dichloropyridine with hydrogen in the presence of a palladium catalyst, and recovering 2-methyl-3(β-chloroethyl)-pyridine from the resulting hydrogenated product.

4. The process for preparing 2-methyl-3-(β-chloroethyl)-pyridine which comprises reacting 2-methyl-3-(β-ethoxyethyl)-4,6-dihydroxypyridine with phosphorus oxychloride at elevated temperature under superatmospheric pressure, recovering 2-methyl-3-(β-chloroethyl)-4,6-dichloropyridine from the resulting reaction mixture, intimately contacting said 2-methyl-3(β-chloroethyl)-4,6-dichloropyridine with hydrogen in the presence of a palladium catalyst, and recovering 2-methyl-3(β-chloroethyl)-pyridine from the resulting hydrogenated product.

5. The process for preparing 2-methyl-3-(β-chloroethyl)-4,6-dichloropyridine which comprises reacting 2-methyl-3-(β-alkoxyethyl)-4,6-dihydroxypyridine with a chlorinating agent from the group consisting of phosphorous oxychloride and phosphorous pentachloride under superatmospheric pressure at an elevated temperature, and recovering 2-methyl-3(β-chloroethyl)-4,6-dichloropyridine from the resulting reaction product.

6. The process for preparing 2-methyl-3-(β-chloroethyl)-4,6-dichloropyridine which comprises reacting 2-methyl-3-(β-ethoxyethyl)-4,6-dihydroxypyridine with a chlorinating agent from the group consisting of phosphorous oxychloride and phosphorous pentachloride under superatmospheric pressure at an elevated temperature, and recovering 2-methyl-3(β-chloroethyl)-4,6-dichloropyridine from the resulting reaction product.

7. The process for preparing 2-methyl-3-(β-chloroethyl)-4,6-dichloropyridine which comprises reacting 2-methyl - 3 - (β-ethoxyethyl)-4,6-dihydroxypyridine with phosphorus oxychloride at a temperature of about 140° C. under superatmospheric pressure, and recovering 2-methyl-3(β-chloroethyl)-4,6-dichloropyridine from the resulting reaction product.

8. The process for preparing 2-methyl-3-(β-chloroethyl)-pyridine which comprises reacting 2-methyl-3-(β-chloroethyl)-4,6-dichloropyridine with hydrogen in the presence of palladium catalyst, and recovering 2-methyl-3(β-chloroethyl)-pyridine from the resulting hydrogenated product.

9. The process for preparing 2-methyl-3-(β-chloroethyl)-pyridine which comprises reacting 2-methyl-3-(β-chloroethyl)-4,6-dichloropyridine with hydrogen in the presence of a palladium-barium sulfate catalyst, and recovering 2-methyl-3(β-chloroethyl)-pyridine from the resulting hydrogenated product.

No references cited.